United States Patent Office 3,641,002
Patented Feb. 8, 1972

3,641,002
BENZODIAZEPINE DERIVATIVES AND SALTS THEREOF
Hisao Yamamoto, Nishinomiya-shi, Sumio Kitagawa, Moriguchi-shi, Shigeho Inaba, Takarazuka-shi, Shigeru Sakai, Toyonaka-shi, Toshiyuki Hirohashi, Kobe, Isamu Maruyama, Minoo-shi, Mitsuhiro Akatsu, Ikeda-shi, and Takahiro Izumi, Takarazuka-shi, Japan, assignors to Sumitomo Chemical Company, Ltd., Osaka, Japan
No Drawing. Filed June 9, 1969, Ser. No. 831,732
Claims priority, application Japan, June 13, 1968, 43/41,109; July 1, 1968, 43/46,042
Int. Cl. C07d 53/06
U.S. Cl. 260—239.3
5 Claims

ABSTRACT OF THE DISCLOSURE

Novel 1-substituted 1,4-benzodiazepin-2-one derivatives represented by the formula,

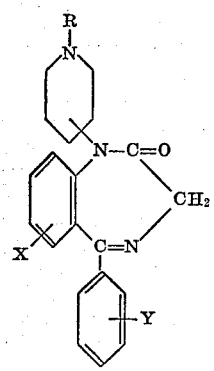

wherein R signifies a lower alkyl group, and X and Y signify respectively a hydrogen atom, a halogen atom, a nitro group or a trifluoromethyl group, which are effective as tranquilizers, muscle-relaxants and hypnotics, are produced by reacting with a reactive ester of a piperidinol derivative of the formula,

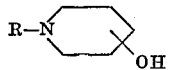

wherein R is as defined above, a 1,4-benzodiazepin-2-one derivative represented by the formula,

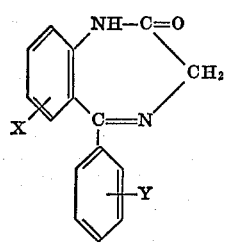

wherein X and Y are as defined above, or contacting, with an oxidizing agent, a 2-aminomethyl-indole derivative represented by the formula,

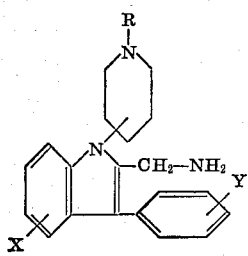

wherein R, X and Y are as defined above.

This invention relates to novel 1-substituted 1,4-benzodiazepin-2-one derivatives and salts thereof, and to processes for preparing the same.

More particularly, the present invention relates to novel 1-substituted 1,4-benzodiazepin-2-one derivatives, and salts thereof, which are effective as tranquilizers, muscle-relaxants and hypnotics.

The present invention provides novel 1-substituted 1,4-benzodiazepin-2-one derivatives, and salts thereof, represented by the Formula I,

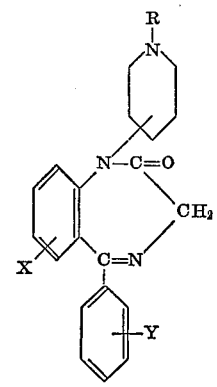

(I)

wherein R signifies a lower alkyl group having up to 4 carbon atoms, and X and Y signify respectively a hydrogen atom, a halogen atom, a nitro group or a trifluoromethyl group.

In the compound represented by the aforesaid Formula I, the lower alkyl group includes, for example, methyl, ethyl, n-propyl, iso-propyl, n-butyl, sec-butyl and tert.-butyl groups, and the halogen atom includes chlorine, bromine, iodine and fluorine. The compounds represented by the Formula I are effective as tranquilizers, muscle-relaxants and hypnotics and are useful for medicines.

The compounds of the present invention may be prepared by a variety of methods, for example, by reacting a 1,4-benzodiazepin-2-one derivative represented by the Formula II

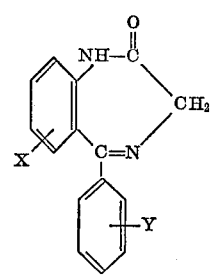

(II)

wherein X and Y are as defined above in the Formula I with a reactive ester of a piperidinol derivative represented by the Formula III,

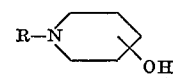

(III)

wherein R is as defined above, in the presence of a basic condensing agent in an inert solvent. The 1,4-benzodiazepin-2-one derivative of the Formula II, which is a starting material of the process of the present invention, is known and prepared by the procedure in our Belgian Patents Nos. 714,914 and 721,214.

Examples of the reactive esters of piperidinol derivative of the Formula III include halides and sulfonic acid esters. The halides include chlorides, bromides and iodides, and the sulfonic acid esters include, for example, methyl sulfonate, p-toluenesulfonate and β-naphthalene-sulfonate esters.

The basic condensing agents include, for example, alkali metal hydrides, alkaline earth metal hydrides, alkali metal hydroxides, alkaline earth metal hydroxides, alkali metal amides, alkaline earth metal amides, alkali metal alkoxides, alkaline earth metal alkoxides, alkylalkali metals and the like.

The reaction is effected in the presence of one or more inert solvents. Examples of the solvents include benzene, toluene, xylene, dimethylformamide, dimethyl sulfoxide, dioxane, methanol, ethanol and the like.

The 1-substituted 1,4-benzodiazepin-2-one derivative of the Formula I can also be prepared by contacting, with a suitable oxydizing agent, a 1-substituted 2-aminomethyl-indole derivative, or a salt thereof, represented by the Formula IV,

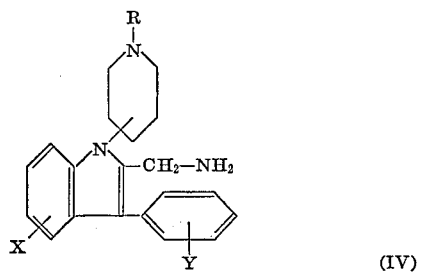

wherein R, X and Y are as defined above, in a solvent.

The oxidizing agent for this process includes, for example, ozone, hydrogen peroxide, peracids (e.g. performic, peracetic and perbenzoic acids), chromic acid, potassium permanganate, and manganese dioxide, but is not limited to the named compounds. Generally, the reaction progresses readily at room temperature, but the temperature may be higher or lower as necessary to effect the desired control of the reaction. The oxidizing agent is preferably chromic acid or ozone. The reaction is effected in the presence of a solvent. The choice of solvent depends on the oxidizing agent employed, and is selected from the group consisting of water, acetone, carbon tetrachloride, acetic acid, and the like. The oxidizing agent is used in the stoichiometric amount or more. The reaction temperature varies depending on the oxidizing agent employed.

Where the oxidation is carried out by use of chromic acid in the presence of acetic acid, it is preferable that the chromic acid may be used in 2-3 times the equimolar amount and the reaction may be carried out at room temperature. A 2-aminomethyl-indole derivative is dissolved or suspended in the solvent and the oxidizing agent is added to the solution or suspension with stirring. Generally, the reaction terminates within about 24 hours.

Where the oxidation is carried out by use of ozone, the reaction is preferably carried out at room temperature. A 2-aminomethyl-indole derivative is dissolved or suspended in the solvent such as formic acid, acetic acid, carbontetrachloride or the like and ozonized oxygen is bubbled into the solution or suspension with stirring.

The 1-substituted 2-aminomethyl-indole derivatives of the Formula IV, which are employed in this process, are novel compounds. They can be prepared by reacting, with a reactive ester of piperidinol derivative of the Formula II, an indole derivative represented by the Formula IV,

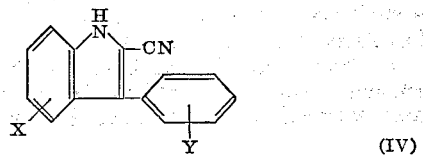

wherein X and Y are as defined above, of which preparation is described in our copending application Ser. Nos. 725,195 filed Apr. 29, 1968 and 762,341, filed Sept. 16, 1968, and then reducing the resulting 1-substituted indole derivative.

The 1-substituted 1,4-benzodiazepin-2-one derivative of the Formula I which is obtained according to the above-mentioned process may also be isolated in the form of an acid addition salt by treatment with an acid, e.g. a mineral acid such as hydrochloric, sulfuric, nitric, phosphoric or chromic acid or an organic acid such as maleic, fumaric, succinic, formic or acetic acid.

According to the process of the present invention, there are produced such 1-substituted 1,4-benzodiazepin-2-one derivatives as shown below.

1-(1'-methyl-4'-piperidinyl)-5-phenyl-1,3-dihydro-2H-1,4-benzodiazepin-2-one
1-(1'-methyl-4'-piperidinyl)-5-phenyl-7-chloro-1,3-dihydro-2H-1,4-benzodiazepin-2-one
1-(1'-methyl-4'-piperidinyl)-5-phenyl-7-bromo-1,3-dihydro-2H-1,4-benzodiazepin-2-one
1-(1'-methyl-4'-piperidinyl)-5-phenyl-7-nitro-1,3-dihydro-2H-1,4-benzodiazepin-2-one
1-(1'-methyl-4'-piperidinyl)-5-phenyl-7-trifluoromethyl-1,3-dihydro-2H-1,4-benzodiazepin-2-one
1-(1'-methyl-4'-piperidinyl)-5-phenyl-6(or 8)-chloro-1,3-dihydro-2H-1,4-benzodiazepin-2-one
1-(1'-methyl-4'-piperidinyl)-5-(o-chlorophenyl)-7-chloro-1,3-dihydro-2H-1,4-benzodiazepin-2-one
1-(1'-methyl-4'-piperidinyl)-5-(o-bromophenyl)-7-chloro-1,3-dihydro-2H-1,4-benzodiazepin-2-one
1-(1'-methyl-4'-piperidinyl)-5-(o-fluorophenyl)-7-chloro-1,3-dihydro-2H-1,4-benzodiazepin-2-one
1-(1'-methyl-4'-piperidinyl)-5-(o-fluorophenyl)-7-nitro-1,3-dihydro-2H-1,4-benzodiazepin-2-one
1-(1'-ethyl-4'-piperidinyl)-5-phenyl-7-chloro-1,3-dihydro-2H-1,4-benzodiazepin-2-one
1-(1'-propyl-4'-piperidinyl)-5-phenyl-7-chloro-1,3-dihydro-2H-1,4-benzodiazepin-2-one
1-(1'-methyl-3'-piperidinyl)-5-phenyl-1,3-dihydro-2H-1,4-benzodiazepin-2-one
1-(1'-methyl-3'-piperidinyl)-5-phenyl-7-chloro-1,3-dihydro-2H-1,4-benzodiazepin-2-one
1-(1'-ethyl-3'-piperidinyl)-5-phenyl-1,3-dihydro-2H-1,4-benzodiazepin-2-one
1-(1'-ethyl-3'-piperidinyl)-5-phenyl-7-chloro-1,3-dihydro-2H-1,4-benzodiazepin-2-one
1-(1'-ethyl-3'-piperidinyl)-5-phenyl-7-nitro-1,3-dihydro-2H-1,4-benzodiazepin-2-one
1-(1'-ethyl-3'-piperidinyl)-5-phenyl-7-trifluoromethyl-1,3-dihydro-2H-1,4-benzodiazepin-2-one
1-(1'-ethyl-3'-piperidinyl)-5-(o-chlorophenyl)-7-chloro-1,3-dihydro-2H-1,4-benzodiazepin-2-one
1-(1'-ethyl-3'-piperidinyl)-5-(o-fluorophenyl)-7-chloro-1,3-dihydro-2H-1,4-benzodiazepin-2-one and their hydrochloride, sulfate, maleate, succinate and the like.

This invention is further disclosed in the following examples of preferred embodiments thereof, which are presented for purposes of illustration and are not intended to limit the scope of the invention.

EXAMPLE 1

To a solution of 4.33 g. of 5-phenyl-7-chloro-1,3-dihydro-2H-1,4-benzodiazepin-2-one in 60 ml. of toluene and 60 ml. of dimethylformamide is added 0.96 g. of 64% sodium hydride. The mixture is stirred at 60° C. for 2 hours. After cooling, 2.6 g. of 1-ethyl-3-chloro piperidine is added to the mixture. The resulting mixture is refluxed for 2 hours. After cooling, 100 ml. of water is added to the reaction mixture with stirring. The organic layer is separated and the aqueous layer is extracted with benzene. The benzene layer is combined with the organic layer, dried over sodium sulfate and evaporated under reduced pressure. The oily residue is dissolved in ether and treated with ethanolic hydrogen chloride under cooling. The precipitate is collected by filtration, washed with cold ethanol and dried to give 1-(1'-ethyl-3'-piperidinyl)-5 - phenyl - 7 - chloro - 1,3 - dihydro - 2H - 1,4 - benzodiazepin-2-one dihydrochloride. Recrystallization from a mixture of ethanol and ether gives colorless crystals having a melting point of 220°–223° C. (decomp.).

EXAMPLE 2

To a solution of 0.87 g. of 5-(o-fluorophenyl)-7-chloro-1,3-dihydro-2H-1,4-benzodiazepin-2-one in 10 ml. of toluene and 10 ml. of dimethylformamide is added 0.18 g. of 64% sodium hydride. The mixture is stirred at 40° C. for 2.5 hours. After cooling, 0.49 g. of 1-ethyl-3-chloro piperidine is added to the mixture. The resulting mixture is refluxed for 4 hours. After cooling, 20 ml. of water is added to the reaction mixture with stirring. The organic layer is separated and the aqueous layer is extracted with benzene. The benzene layer is combined with the organic layer, dried over sodium sulfate and evaporated under reduced pressure. The oily residue is dissolved in ether and treated with ethanolic hydrogen chloride under cooling. The precipitate is collected by filtration, washed with cold ethanol and dried to give 1-(1'-ethyl-3'-piperidinyl)-5 - (o - fluorophenyl) - 7 - chloro - 1,3 - dihydro - 2H-1,4-benzodiazepin-2-one dihydrochloride, M.P. 207°–211° C. (decomp.). Recrystallization from ethanol gives colorless crystals having a melting point of 217°–220° C. (decomp.).

EXAMPLE 3

To a solution of 2.4 g. of 5-phenyl-7-nitro-1,3-dihydro-2H-1,4-benzodiazepin-2-one in 25 ml. of toluene and 25 ml. of dimethylformamide is added 0.35 g. of 64% sodium hydride. The mixture is stirred at 47° C. for 2 hours. After cooling, 1.4 g. of 1-ethyl-3-chloropiperidine is added to the mixture. The resulting mixture is refluxed for 5 hours. After cooling, 40 ml. of water is added to the reaction mixture with stirring. The organic layer is separated an dthe aqueous layer is extracted with benzene. The benzene layer is combined with the organic layer, dried over sodium sulfate and evaporated under reduced pressure. The oily residue is dissolved in benzene and chromatographed on silica-gel. The column is eluted with ethyl acetate. The elute is evaporated under reduced pressure. The oily residue is dissolved in ether and treated with ethanolic hydrogen chloride under cooling. The precipitate is collected by filtration, washed with cold ethanol and dried to give 1-(1'-ethyl-3'-piperidinyl)-5-phenyl-7-nitro - 1,3 - dihydro - 2H - 1,4 - benzodiazepin - 2 - one dihydrochloride, M.P. 213°–215° C. (decomp.). Recrystallization from ethanol gives yellow crystals having M.P. 213°–215° C. (decomp.).

EXAMPLE 4

A solution of 3 g. of chromic anhydride in 3 ml. of water is added dropwise to a mixture of 4.1 g. of 1-(1'-ethyl - 3' - piperidinyl) - 2 - aminomethyl - 3 - phenyl-5-chloro-indole dihydrochloride and 40 ml. of glacial acetic acid under cooling with stirring. The mixture is stirred at room temperature overnight. The reaction mixture is basified with ammonia water under cooling and extracted with chloroform. The chloroform extracts are combined and dried over sodium sulfate and concentrated under reduced pressure. The residue is chromatographed on silica gel to give 1-(1'-ethyl-3-piperidinyl)-5-phenyl-7-chloro-1,3-dihydro-2H-1,4-benzodiazepin-2-one as an oil. The dihydrochloride is prepared with hydrogen chloride in ether. Recrystallization from a mixture of ethanol and ether gives colorless crystals having M.P. 220°–223° C. (decomp.), which are identified by comparison of the infrared spectrum with that of 1-(1'-ethyl-3'-piperidinyl)-5 - phenyl - 7 - chloro - 1,3 - dihydro - 2H - 1,4-benzodiazepin-2-one dihydrochloride obtained in Example 1.

What we claim is:

1. A 1-substituted 1,4 - benzodiazepin - 2 - one, or pharmaceutically acceptable acid addition salt thereof, represented by the formula (I),

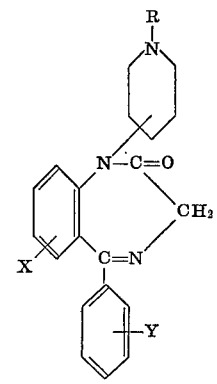

(I)

wherein R signifies a lower alkyl group having up to 4 carbon atoms, and X and Y signify respectively a hydrogen atom, a halogen atom, a nitro group or a trifluoromethyl group.

2. 1 - (1' - ethyl - 3' - piperidinyl) - 5 - phenyl - 7-chloro-1,3-dihydro-2H-1,4-benzodiazepin-2-one.

3. 1 - (1' - ethyl - 3' - piperidinyl) - 5 - (o - fluorophenyl) - 7 - chloro - 1,3 - dihydro - 2H - 1,4 - benzodiazepin-2-one.

4. 1 - (1' - ethyl - 3' - piperidinyl) - 5 - phenyl - 7-nitro-1,3-dihydro-2H-1,4-benzodiazepin-2-one.

5. A 1-substituted 1,4-benzodiazepin-2-one according to claim 1 wherein said acid addition salt is a hydrochloric, sulfuric, nitric, phosphoric, chromic, maleic, fumaric, succinic, formic or acetic pharmaceutically acceptable acid addition salt.

References Cited

UNITED STATES PATENTS 3,299,053  1/1967  Archer et al. _____ 260—239.3

HENRY R. JILES, Primary Examiner

R. T. BOND, Assistant Examiner

U.S. Cl. X.R.

260—293 D, 326.15